United States Patent
Hediger

(10) Patent No.: US 9,592,579 B2
(45) Date of Patent: Mar. 14, 2017

(54) CLAMPING FIXTURE

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 142 days.

(21) Appl. No.: 14/462,666

(22) Filed: Aug. 19, 2014

(65) Prior Publication Data

US 2015/0115553 A1    Apr. 30, 2015

(30) Foreign Application Priority Data

Oct. 25, 2013    (CH) .................................... 1807/13

(51) Int. Cl.
| | |
|---|---|
| B23B 31/00 | (2006.01) |
| B23Q 3/18 | (2006.01) |
| B23B 31/107 | (2006.01) |
| B23Q 3/06 | (2006.01) |
| B23Q 1/00 | (2006.01) |

(52) U.S. Cl.
CPC ............ B23Q 3/183 (2013.01); B23B 31/001 (2013.01); B23B 31/1071 (2013.01); B23Q 1/0072 (2013.01); B23Q 3/06 (2013.01); *Y10T 279/26* (2015.01); *Y10T 279/3418* (2015.01); *Y10T 279/3493* (2015.01)

(58) Field of Classification Search
CPC .......... B23B 2270/12; B23B 2260/126; B23B 2231/36; B23B 31/00; B23B 31/001; B23Q 1/0072; B23Q 3/183; B23Q 3/06; Y10T 279/3493; Y10T 279/26
See application file for complete search history.

(56) References Cited

U.S. PATENT DOCUMENTS

| | | | | |
|---|---|---|---|---|
| 2,376,594 | A | * | 5/1945 | Hite ...................... B23B 31/001 279/46.9 |
| 4,662,043 | A | * | 5/1987 | Stone .................... B23B 31/204 198/345.3 |
| 4,996,908 | A | * | 3/1991 | Thompson ............ B23B 31/302 277/549 |

(Continued)

*Primary Examiner* — Eric A Gates
*Assistant Examiner* — Chwen-Wei Su
(74) *Attorney, Agent, or Firm* — Maginot, Moore & Beck, LLP

(57) ABSTRACT

The invention relates to a clamping fixture comprising a chuck (1) and for locking thereto a workpiece pallet (2). The chuck (1) comprises first centering members in the form of centering spigots (5) whilst said workpiece pallet (2) is provided with a main body (20) and secured thereto a centering disk (23). The centering disk (23) is provided with second centering members in the form of centering openings (24). The centering spigots (5) of the workpiece pallet (2) are adapted to the centering openings (24) of the workpiece pallet (2) that the latter is alignable in the X-direction and Y-direction on clamping to the chuck (1). Provided topping the chuck (1) is a sealing member assembly (7). Disposed between the centering disk (23) and the main body (20) of the workpiece pallet (2) is a sealing disk (21) which overhangs the centering disk (23) radially. The portion of the sealing disk (21) overhanging the centering disk (23) radially is configured such that said portion sealingly comes into contact with a sealing member of the sealing member assembly (7) when clamping the workpiece pallet (2).

16 Claims, 5 Drawing Sheets

(56) References Cited

U.S. PATENT DOCUMENTS

| | | | | |
|---|---|---|---|---|
| 6,073,940 | A * | 6/2000 | Tabachenko | B23B 31/001 279/110 |
| 2005/0098959 | A1* | 5/2005 | Uhrner | F16J 15/3228 277/500 |
| 2005/0238450 | A1* | 10/2005 | Nie | B23B 31/103 409/225 |
| 2005/0248103 | A1* | 11/2005 | Kramer | B23B 31/1071 279/43 |
| 2006/0113732 | A1* | 6/2006 | Hediger | B23Q 1/0072 279/19.3 |
| 2009/0051094 | A1* | 2/2009 | Sandmeier | B23B 31/1078 269/258 |
| 2009/0102143 | A1* | 4/2009 | Sandmeier | B23Q 1/0072 279/110 |
| 2013/0249156 | A1* | 9/2013 | Haruna | B23Q 1/009 269/32 |

* cited by examiner

CLAMPING FIXTURE

The present invention relates to a clamping fixture configured as set forth in the preamble of claim 1, to a workpiece pallet configured as set forth in the preamble of claim 11 for a clamping fixture, and to a sealing disk configured as set forth in the preamble of claim 15 for a workpiece pallet.

Generic clamping fixtures are employed for clamping pallets for workpieces or tools defined in position wherein the chuck is usually fixedly clamped to a worktable and a machine tool or press whilst the workpiece pallet can be repeatedly fixed in place and re-released positionally exact.

Known clamping fixtures are provided with a chuck comprising a central opening for mounting a clamping spigot arranged on the workpiece pallet. Provided within the chuck is a clamping fixture by means of which the clamping spigot and thus the workpiece pallet can be drawn and clamped in place against the chuck. To ensure repeatedly precise positioning of the workpiece pallet at the chuck the chuck is preferably provided with a plurality of centering spigots and the workpiece pallet with a corresponding number of centering openings. When clamping the workpiece pallet to the chuck the centering spigots mate in the centering openings in thus positioning the workpiece pallet relative to the chuck. Normally the centering openings are dimensioned at least in one direction, namely in the radial direction, somewhat larger than the corresponding centering spigots so that after the workpiece pallet is clamped to the chuck a gap remains on both sides of the centering spigot between each centering spigot and the corresponding central opening.

One problematic situation basic to clamping fixtures configured as such is that during machining a workpiece clamped to the workpiece pallet soilage, for example in the form of swarf and the like may collect among other things in the cited gap between each centering spigot and the corresponding central opening in the chuck. Furthermore there is also the risk that in addition to the soilage other debris/elements such as for example coolant may gain access to the chuck. It will be understood that this soilage nuisance is a problem on the one hand for correct functioning of the chuck, since soilage for example can result in the clamping mechanism being blocked up, whilst, on the other, the accumulation of soilage can also negatively influence repeat accuracy when clamping a workpiece pallet in place. To eliminate this problem clamping fixtures are known which for example feature a seal at the chuck for a sealing contact with the underside of the workpiece pallet. Whilst this is relatively simply to achieve with round workpiece pallets, sealing especially rectangular workpiece pallets is more difficult because with rectangular workpiece pallets contact surfaces forming the Z contact need to be arranged usually fully outwards in the corners of the workpiece pallet in favour of a high stability. This is why no material remains outside of the contact surfaces which could be used to seal off the workpiece pallet relative to the chuck.

Another problem is that a wide variety of workpiece pallets exist all differing in geometry. In addition, workpiece pallets featuring greatly differing recesses are in use, depending on the configuration of which may also hamper proper sealing. On the other hand workpiece pallets within a series may also slightly differ in their outer dimensions, for example by 1 to 2 mm.

The invention is directed at sophisticating a clamping fixture with a chuck and a workpiece pallet for clamping in place such that the clamping fixture is now impervious to soilage by the workpiece pallet being clamped to the chuck so that now when machining a workpiece clamped to the workpiece pallet no soilage can gain access to the chuck, particularly to its clamping mechanism.

For this purpose in accordance with the invention a clamping fixture is now made available as set forth in claim 1.

Now, by arranging between the centering disk and the main body of the workpiece pallet a sealing disk which radial overhangs the centering disk, the portion of the sealing disk overhanging the centering disk radial being so configured that on clamping the workpiece pallet the portion comes into sealing contact with a sealing member of the sealing member assembly, it is now assured by simple ways and means that the clamping fixture of the chuck is impervious to soilage. Such an achievement also has the advantage it is practically independent of the shape and geometry of the workpiece pallet since sealing can now be assured by the sealing disk and a corresponding sealing member.

Preferred aspects and further embodiments of the clamping fixture read from the dependent claims 2 to 10.

In one particularly preferred further embodiment the sealing disk is arranged parallel to the centering disk and is provided in the region of the centering openings of the centering disk with depressions into which the centering spigots can extend when the workpiece pallet is clamped to the chuck. In such a configuration only a very slight spacing needs to be provided between the sealing disk and the centering disk.

In another particularly preferred further embodiment of the clamping fixture disposed between the centering disk and a sealing disk is at least one spacer disk which permits an axial excursion of the centering disk in the region of the centering openings. This is a simple and cost-effective achievement to attain a pliant excursion of the centering disk when clamping the workpiece pallet.

In yet another particularly preferred further embodiment of the clamping fixture the sealing member of the sealing member assembly is provided with a sealing lip in the edge portion of the recess. This lip achieves a sealed connection between the sealing plate and the chuck.

In still another particularly preferred further embodiment of the clamping fixture the workpiece pallet is provided with four studs which are flat-topped in forming a Z-stop for the workpiece pallet on being clamped to the chuck. This results in the workpiece comprising a defined Z-stop. By these studs simultaneously being configured to secure the centering disk as well as the sealing disk to the main body of the workpiece pallet, the studs can be used multi-functional simultaneously.

A further object of the invention involves proposing a workpiece pallet which is especially suitable for use in a generic clamping fixture by it being clampable to the clamping fixture in such a way that it is insensitive to soilage.

To achieve this object a workpiece pallet is proposed comprising a main body and a centering disk secured thereto in which second centering members are machined in the form of centering openings, whereby disposed between the centering disk and the main body of the workpiece pallet is a sealing disk which overhangs the centering disk radially. Providing such a sealing disk has the advantage irrespective of how the main body of the workpiece pallet is configured it can be adapted to the sealing member.

Preferred further embodiments of the workpiece pallet are defined in the dependent claims 12 to 14.

Another object of the invention involves proposing for an aforementioned workpiece pallet a centering disk which is both simple and cost-effective to produce.

This object is achieved by a sealing disk configured as set forth in claim 15.

In conclusion yet a further object of the invention is to configure a sealing device for a generic clamping fixture such that it finds universal application.

This object is achieved by a sealing device configured as set forth in claim 16.

Described in more detail in the following is a preferred example embodiment of the clamping fixture in accordance with the invention with reference to the attached drawings in which.

Figure 1:
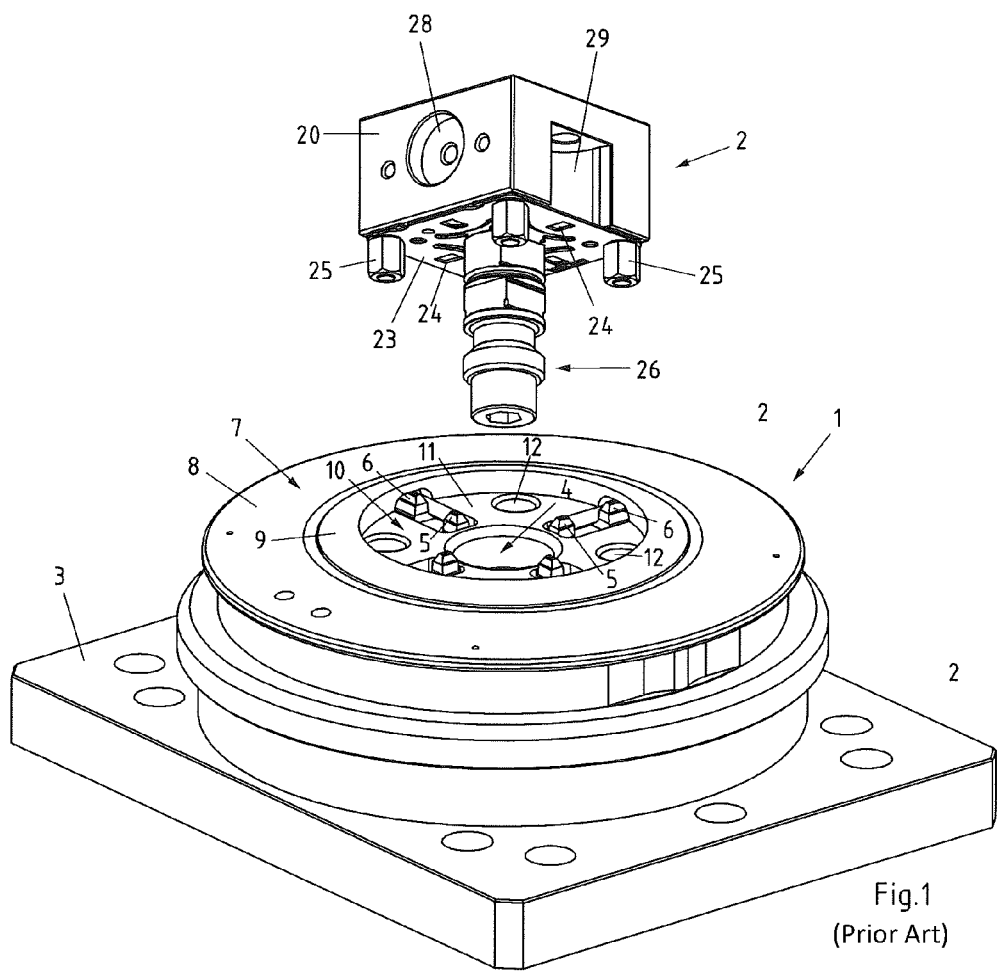
FIG. 1 shows a chuck and a workpiece pallet of a clamping fixture configured as in prior art.

Referring now to FIG. 1 there is illustrated a clamping fixture configured as in prior art by way of which the structure and working of a generic clamping fixture will now be detailed. The clamping fixture comprises a chuck 1 and a workpiece pallet 2 clampable thereto. The chuck 1 is provided with a central opening 4 serving to mount a clamping spigot 26 arranged on the workpiece pallet 2. To clamp the clamping spigot 26 the chuck 1 comprises a clamping mechanism the means of which in this case are not shown.

The workpiece pallet 2 serves to mount workpieces or tools and can be positioned repeatedly precisely at the chuck 1. For this purpose the chuck 1 is provided with centering members in the form of centering spigots 5, 6 whilst the workpiece pallet 2 comprises further centering members in the form of centering openings 24. In this example the chuck 1 comprises four centering spigots 5 arranged on an inner circle and four further centering spigots 6 arranged on an outer circle. The centering openings 24 of the workpiece pallet 2 as shown are adapted to the inner centering spigots 5 whilst the outer centering spigots 6 serve to cooperate together with a larger workpiece pallet (not shown). Both the four centering spigots 5, 6 as well as the four centering openings 24 are each arranged offset 90° to each other.

The four centering openings 24 are machined in a centering disk 23 which is secured by means of four studs 25 to the underside of the workpiece pallet 2 respectively its main body 20. The centering disk 23 is preferably made of a steel sheet metal, the openings being preferably formed by stamping. Disposed furthermore between the centering disk 23 and the main body 20 of the workpiece pallet 2 is a spacer disk (not shown) such that the centering disk 23 in the region of the centering openings 24 is slightly pliantly deflectable in the Z-direction, i.e. in the direction of the main body 20. The face of each stud 25 is flat in forming a Z-stop for the workpiece pallet 2 when clamped to the chuck 1. Preferably the face of the studs 25 is machined by grinding or lapping. The chuck 1 features a base body 11 at which the centering spigot 5, centering spigots 6 are arranged and which is provided with four depressions 12, the bottom of which serves as a stop for the cited studs 25 when clamping the workpiece pallet 2. The base body 11 of the chuck 1 is arranged on a baseplate 3.

The chuck 1 is topped by a sealing member assembly 7 consisting of an annular topper 8 and a round sealing member 9 with a central round recess 10. This sealing member assembly 7 is suitable for sealing round workpiece pallets (not shown) which sealingly come into contact by their underside at the round sealing member 9 when clamping to the chuck 1. For this purpose each workpiece pallet has a somewhat larger diameter than the central recess 10 of the round sealing member 9. However, if a rectangular workpiece pallet 2, as shown, need to be clamped to the chuck 1 this does not sealingly come into contact at the round sealing member 9 of the sealing member assembly 7 as will be later explained.

In the workpiece pallet 2 as shown the four studs 25 are arranged in the four corners of the main body 20. Machined in the one side surface of the workpiece pallet 2 or of the main body 20 is a round recess 28 which, however, does not extend down to the underside of the main body 20 in, for instance serving to receive an identification chip. Machined in the other side of the main body 20 is a rectangular recess 29 extending down to the underside in serving to clamp workpieces from underneath through the workpiece pallet. Arranged at the side opposite the rectangular recess 29 the main body 20 is likewise provided with a corresponding recess. The workpiece pallet 2 as shown in this case stands representative for a plurality of diverse workpiece pallets which may differ not only in the dimensions but also in the configuration and geometry.

When clamping the workpiece pallet 2 to the chuck 1 each centering spigot 5 mates in the corresponding centering openings 24 of the centering disk 23, causing the side surfaces of the conical centering spigot 5 to come into contact with the side walls of the centering disk 23 defining the centering openings 24, as a result of which the workpiece pallet 2 is aligned relative to the chuck 1. By providing four centering spigots 5 each offset from the other by 90° and a corresponding number of centering openings 24 the workpiece pallet 2 when being clamped to the chuck 1 is aligned in the X-direction and Y-direction as well as regards the angular positioning about the Z-axis. Since each centering opening 24 is somewhat longer than each centering spigot 5 a gap in the centering disk 23 remains free on both sides of each centering spigot 5.

Figure 2:
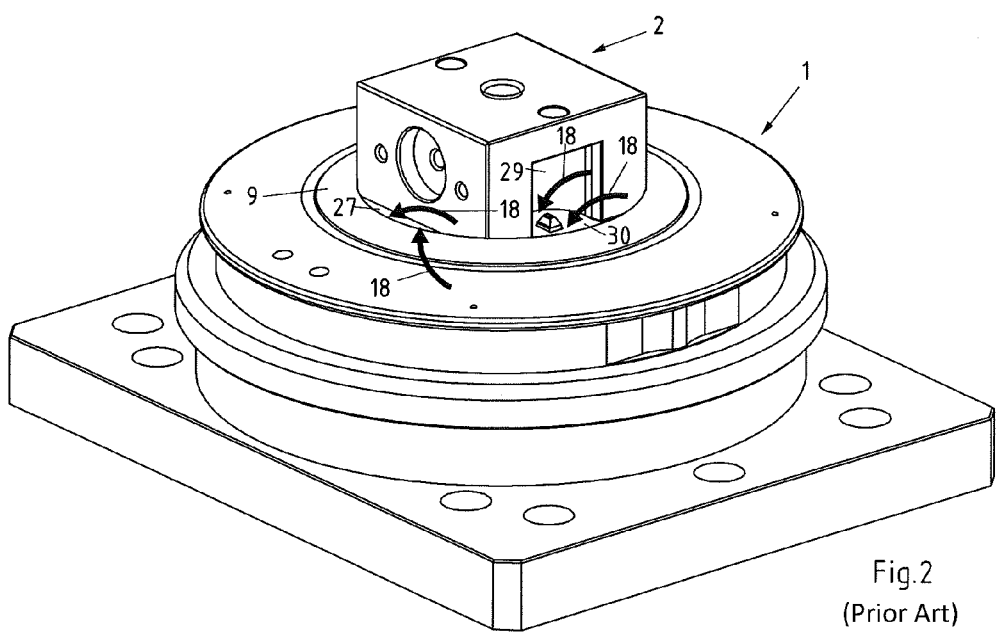
FIG. 2 shows the chuck with, clamped thereto, the workpiece pallet as shown in FIG. 1.

Referring now to FIG. 2 there is illustrated the chuck 1 together with the workpiece pallet 2 clamped thereto. As is evident between each side surface of the workpiece pallet 2 and the round sealing member 9 a gap 27, 30 exists, the gap 27 running along the one side being relatively small or narrow whilst the other gap 30 running along the other side provided with a rectangular recess 29 is comparatively large or wide. Both via the narrow gap 27 as well as via the wide gap 30 soilage can gain access to the inner workings of the chuck 1 as is indicated by the arrow 18 and which can result in the problems as commented at the outset. The soilage is able to find access into the chuck 1 both on the side along each face of the centering disk 23 as well as via the gap existing on both sides between a centering spigot and the corresponding central opening. Via the gap between the centering disk 23 and the main body 20 as well as via any through holes or openings in the centering disk 23, too, soilage may gain access into the chuck 1.

Figure 3:
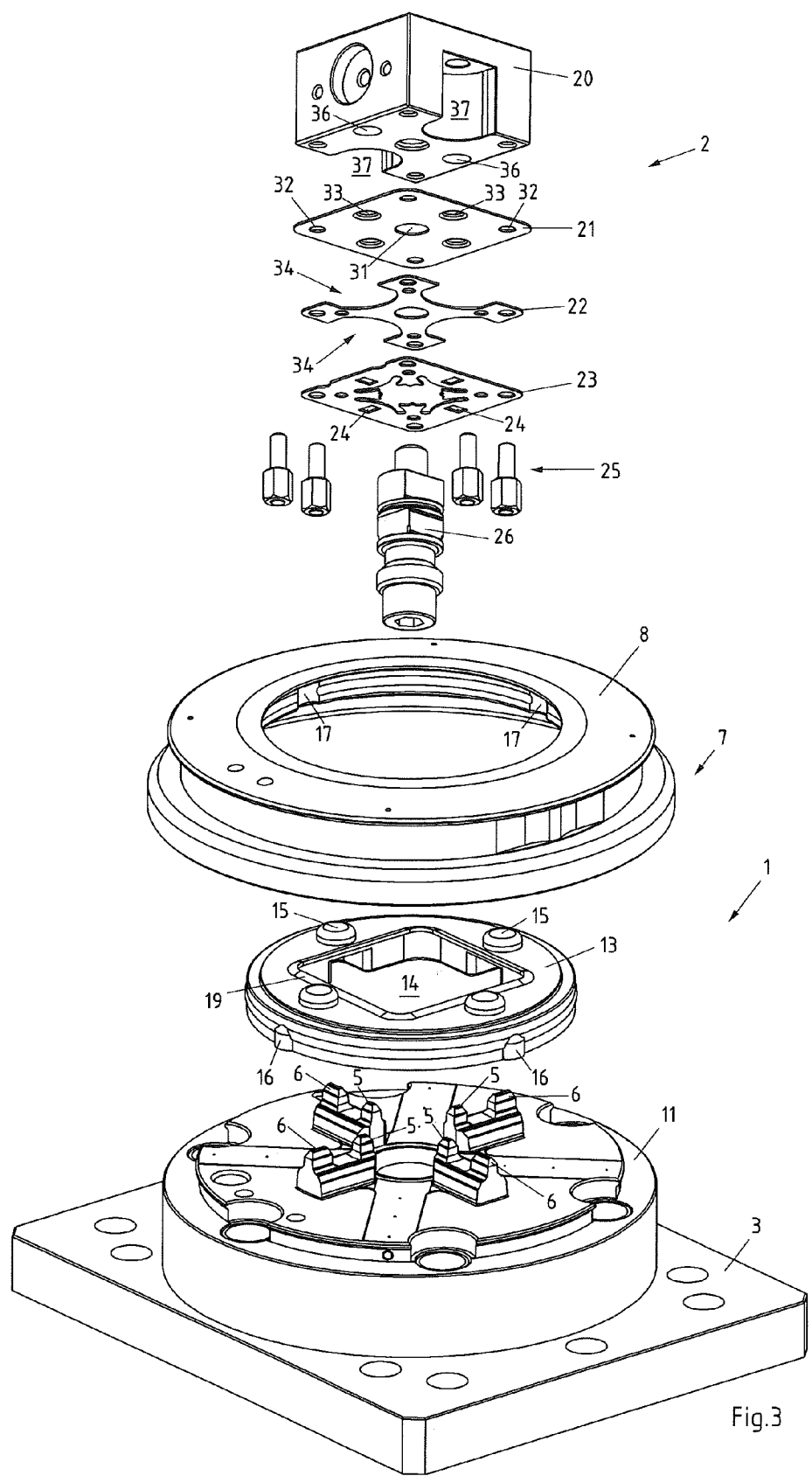
FIG. 3 shows a chuck and a workpiece pallet of a clamping fixture configured in accordance with the invention in an exploded view.

Referring now to FIG. 3 there is illustrated a clamping fixture configured in accordance with the invention as shown in an exploded view, namely a chuck 1 and a workpiece pallet 2. In addition to the base body 11 secured to the baseplate 3 the chuck 1 comprises again a sealing member assembly 7 consisting of an annular topper 8 and a round sealing member 13. The central recess 14 of the sealing member 13 is in this case adapted to the shape and size of the workpiece pallet 2 and configured rectangular. Arranged topping the sealing member 13 is an elastically pliable sealing lip 19 running along the recess 14. The side surface of the sealing member 13 is provided with four cam-like protuberances 16 only two of which are shown in this FIG. The annular topper 8 comprises on the inside recesses 17 which in shape and location correspond to the cam-like protuberances 16. On insertion of the sealing member 13 into the annular topper 8 the cited protuberances 16 engage the recesses 17 so that the sealing member 13 is oriented in relation to the annular topper 8. In addition, the sealing member 13 is provided with four circular elevated members 15 extending over the surface. In the rear side of these elevated members 15 recesses 17 are machined in the sealing member 13 into which the four outer centering spigots 6 can extend. The annular topper 8 is secured to the base body 11 of the chuck 1 preferably by means of a radial or axial arrangement of bolts (not shown).

The workpiece pallet 2 which in cross-section is configured substantially square of the clamping fixture configured in accordance with the invention comprises a sealing disk 21 secured to the underside of the main body 20 followed downwards by a spacer disk 22, the centering disk 23 and the clamping spigot 26. Also evident are four studs 25 serving to secure the cited disks 21, 22, 23 to the main body 20 and the face of which simultaneously serve as a Z-mount so that the studs 25 function both as fasteners and also spacers.

The substantially square configured sealing disk 21 features in addition to a central opening 31 for receiving the clamping spigot 26 four openings 32 which are arranged in the region of the corners and serving to secure the sealing disk 21 by means of the studs 25. In addition the sealing disk 21 features in the region of the centering openings 24 of the centering disk 23 four depressions 33 extending upwards in the direction of the underside of the main body 20 into which the inner centering spigot 5 of the chuck 1 can extend on clamping the workpiece pallet 2. The depressions 33 of the sealing disk 21 are configured by material-plastic shaping and are preferably produced by deep drawing, as a result of which the sealing disk 21 can be produced in one piece and thus relatively cost effectively. The sealing disk 21 is preferably made of a steel sheet metal, the holes/openings in which are preferably produced by stamping.

The main body 20 of the workpiece pallet 2 is provided with recesses 37 extending down to the underside or boreholes 36 machined in the underside such that the depressions 33 in the sealing disk 21 which form elevations at the side facing the main body 20 can extend into the corresponding boreholes 36 or recesses 37. When securing the sealing disk 21 to the underside of the main body 20 it comes into contact by its flat top and thus sealingly with the flat underside of the main body 20. It is in this way that the sealing disk 21, where necessary together with the underside of the workpiece pallet 2 in the clamped condition of the workpiece pallet 2 at the chuck 1, forms a kind of lid sealingly in contact with the sealing member 13 and sealing the chuck 1 upwards.

The spacer disk 22 is configured cruciform by it being provided in the region of the centering openings 24 of the centering disk 23 with four semicircular recesses 34. These recesses 34 make it possible that the centering disk 23 in the region of the centering openings 24 is slightly deflectable in the Z-direction, namely in the direction of the underside of the main body 20. This pliant deflectability of the centering disk 23 is needed to achieve concluding positioning of the workpiece pallet 2 in the Z-direction since after alignment of the workpiece pallet in the X-direction and Y-direction a small gap of a few hundredths of a millimeter still exists between the face of the studs 25 and the corresponding contact surface at the chuck 1. Aligning the workpiece pallet 2 in the X-direction and Y-direction is done by loose placement of the workpiece pallet 2 on the chuck 1. When loosely placing the workpiece pallet 2 free of any clamping force the centering spigots 5 of the chuck 1 enter into the centering openings 24 of the centering disk 23. In doing so, the side surfaces of the conical centering spigot 5 come into contact with the two side edges of each centering openings 24 in aligning the workpiece pallet 2 in the X-direction and Y-direction. After loose placement of the workpiece pallet 2 said minor gap still remains between the face of each of the studs 25 and the corresponding contact surface at the chuck 1. Conclusive positioning in the Z-direction is then done by the clamping mechanism of the chuck 1 engaging the clamping spigot 26 of the workpiece pallet 2 and pulling it into place, thereby slightly deflecting the centering disk 23 by the centering spigot 5 in the region of the centering openings 24 in the Z-direction. On clamping the workpiece pallet 2 to the chuck 1, the latter come into contact sealingly by its sealing disk 21 on the sealing lip 19 of the sealing member 13.

By providing a sealing disk 21 of this kind the studs 25 can on the one hand be sited in the four corners and thus very far outwards at the workpiece pallet 2 or its main body 20 whilst simultaneously assuring that the chuck 1 with the workpiece pallet 2 clamped thereto is practically immune to the ingress of soilage. Sitting the studs 25 in the four corners of the workpiece pallet 2 adds to a good stability of the workpiece pallet 2 clamped to the chuck 1 since the studs 25 simultaneously form the Z-mount for the workpiece pallet 2.

Since when clamping the workpiece pallet 2 to the chuck 1 the centering spigots 5 can extend into the depressions 33 of the sealing disk 21 the centering disk 23 can be arranged in the Z-direction very near to the sealing disk 21. Theoretically it is sufficient when the centering disk 23 is spaced from the sealing disk 21 by the maximum possible amount of pliant deflection of the centering disk 23 in the region of the centering openings 24.

The sealing member assembly 7 forms together with the sealing disk 21 a sealing device which is universally applicable by it being able to be adapted to most diverse workpiece pallets and chucks. The sealing disk is suitable both for use on new clamping fixtures and also for retrofitting to existing clamping fixtures.

Figure 4:
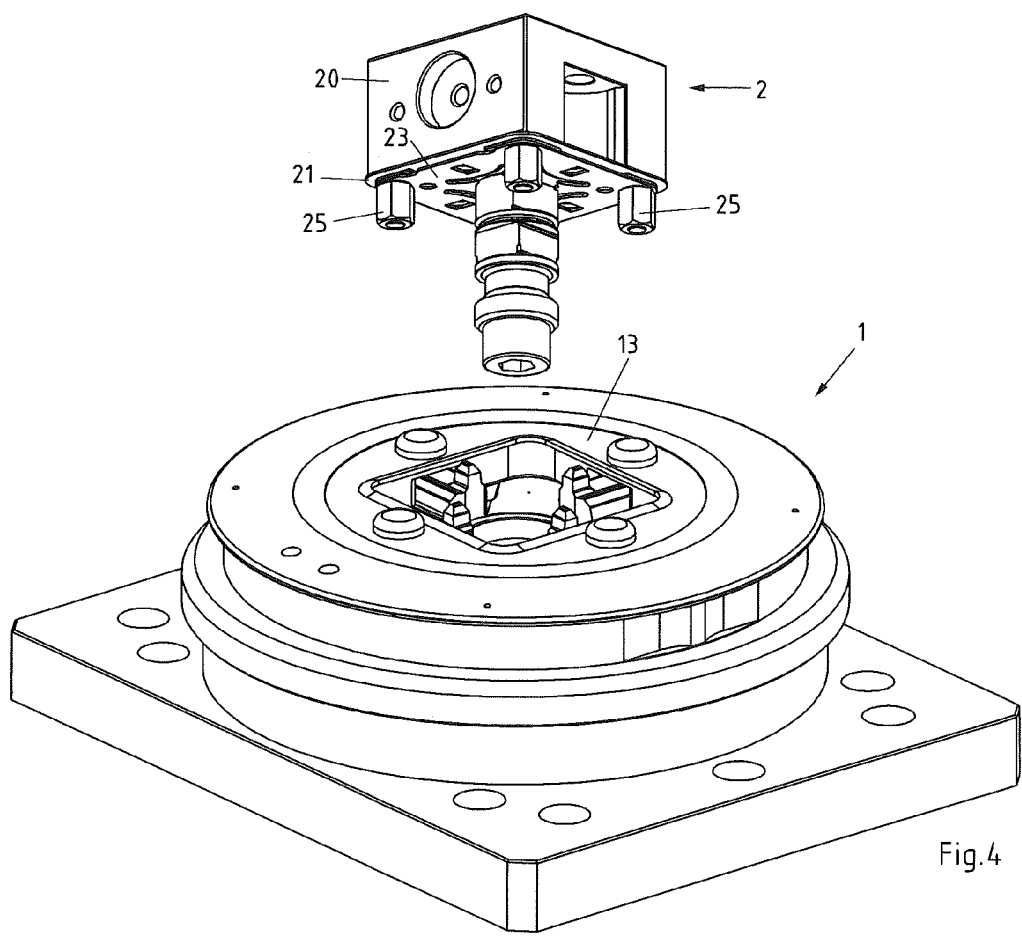
FIG. 4 shows the clamping fixture as shown in FIG. 3 in the assembled condition.

Referring now to FIG. 4 there is illustrated the chuck 1 and the workpiece pallet 2 as shown in FIG. 3 each in the assembled condition. As is evident, the sealing disk 21 overhangs the spacer disk 22 in the radial direction. Preferably the sealing disk 21 overhangs the centering disk 23 in the radial direction by approx 1 to 3 mm. In addition to the centering disk 23 the sealing disk 21 overhangs also the four studs 25 arranged fully outwards at the main body 20 in the radial direction. This results in the sealing disk 21 comprising a rim outwardly surrounding the centering disk 23 by means of which the sealing disk 21 or the workpiece pallet 2 can be sealingly brought into contact with the sealing member 13.

Figure 5:
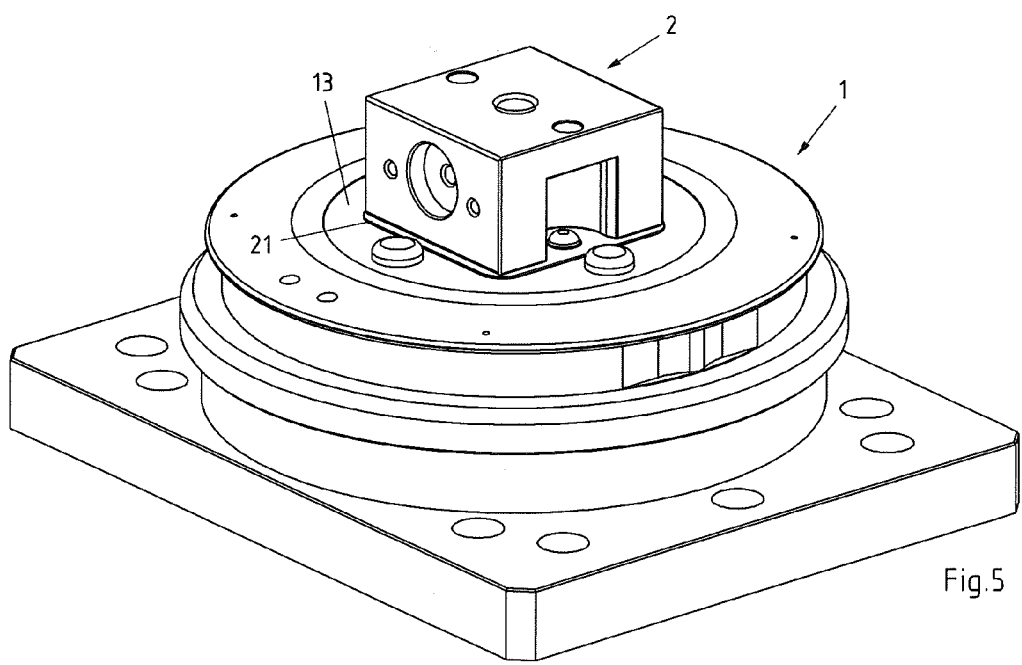
FIG. 5 shows the chuck with the workpiece pallet as shown in FIG. 4 clamped thereto.

Referring now to FIG. 5 there is illustrated the workpiece pallet 2 clamped to the chuck 1 as shown in FIG. 4. The workpiece pallet 2 comes into contact with the sealing member 13 by the portion of the sealing disk 21 overhanging the centering disk in the radial direction. It will be understood that the sealing member 13 arranged at the chuck 1 is adapted to the workpiece pallet 2 such that the outermost portion of the sealing disk 21 comes into contact sealingly by its underside with the sealing member 13 as soon as the workpiece pallet 2 is clamped to the chuck 1. For a secure contact of the workpiece pallet 2 at the sealing member 13 use is made in addition to the weight of the workpiece pallet 2 also the axial motion (Z-direction) of the workpiece pallet 2 when clamping in conjunction with the elasticity of the sealing member 13.

Figure 6:
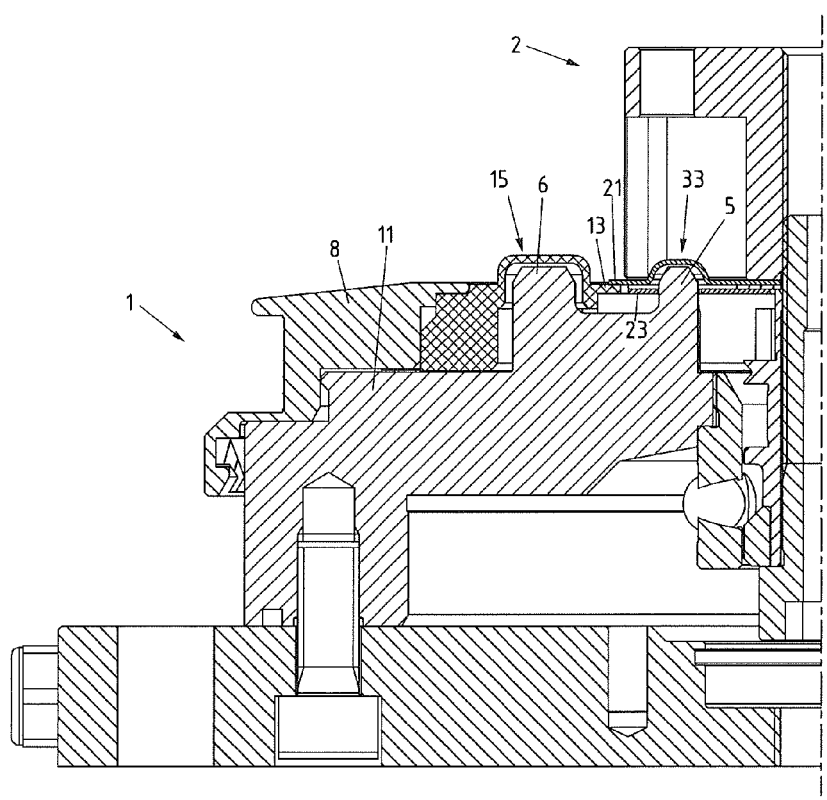
FIG. 6 shows a partial longitudinal section through the example embodiment as shown in FIG. 5.

Referring now to FIG. 6 there is illustrated a partial longitudinal section through the workpiece pallet 2 clamped to the chuck 1 as shown in FIG. 5. This illustration makes it evident how the portion of the sealing disk 21 overhanging the centering disk 23 in the radial direction comes into contact with the sealing member 13. Also evident is that the inner centering spigot 5 extends into the depression 33 of the sealing disk 21. The outer centering spigot 6 extends into the rear side of the elevated member 15 of the sealing member 13. Lastly evident is how the annular topper 8 urges the sealing member 13 against the surface of the base body 11 of the chuck 1. Since the sealing disk 21 together with the annular topper 8 and the sealing member 13 seal off the chuck 1 at the top no soilage can gain access to the inside of the chuck 1 when the workpiece pallet 2 is clamped in place.

Figure 7:
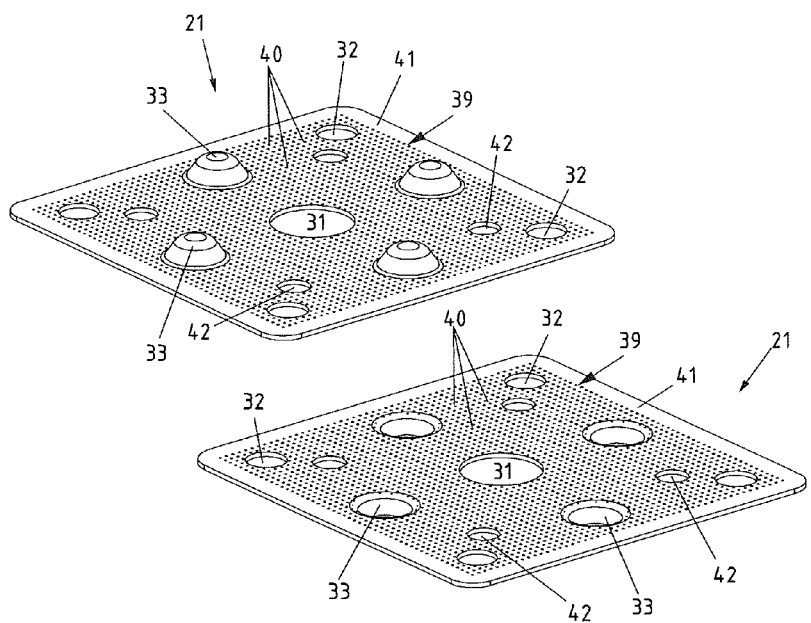
FIG. 7 shows an alternative embodiment of a sealing disk.

Referring now to FIG. 7 there is illustrated an alternative embodiment of the sealing disk 21 in a view top down and bottom up. To check the tendency of the sealing disk 21 to deform, the sealing disk 21 made of metal is provided with an indentation 39. The indentation 39 is formed by a plurality of recesses 40 indented in the sealing disk 21 by means of plastic cold shaping. Preferably both flat sides of the sealing disk 21 are provided with an indentation 39. The depth of the individual recesses 40 as well as their number and shape are all selected to comply with requirements. But in any case the indentation 39 is selected such that the dimensional stability is improved as compared to a "plain sheet". Especially of advantage has proven to be a corrugated indentation, the indentation 39 being preferably done by means of stamping or rolling. However, at least at the underside of the sealing disk 21 to face the chuck 1 a non-indented strip 41 remains along the edge at which the elastically pliant sealing lip 19 of the sealing member 13 (FIG. 3) can come into sealing contact. It is particularly preferred to make the indentations after deep drawing the depressions 33. This counteracts, even eliminating in part, the distortion due to deep drawing. By providing the sealing disk 21 on both sides with an indentation 39 the tendency to any deformation is in any case diminished, whereas stamping the openings 31, 32, 42 is preferably done after having applied the indentation. In addition to the openings 31, 32 already mentioned assembly openings 42 are evident which are arranged radial within the openings 32 (fastener boreholes) which together with other members can be of assistance in assembling the sealing disk 21.

In a summary conclusion it is to be noted that the clamping fixture configured in accordance with the invention is suitable for clamping particularly a square workpiece pallet to a chuck such that the chuck is practically protected from soilage, suitable both for use on new clamping fixtures and also for retrofitting to existing clamping fixtures. Where the existing chuck is already provided with a sealing member or sealing member assembly it may be sufficient to simply retrofit the workpiece pallet with a sealing disk adapted to the sealing member. On the other hand solutions are, of course, just as possible in which the chuck and workpiece pallet are retrofitted respectively with a sealing member assembly and a sealing disk.

What is claimed is:

1. A clamping fixture comprising a chuck and for locking thereto a workpiece pallet, said chuck comprising:
   first centering members in the form of centering spigots;
   said workpiece pallet provided with a main body and removably secured thereto a centering disk into which second centering members in the form of centering openings are defined;
   said centering spigots of said chuck configured to mate in said centering openings of the workpiece pallet such that the pallet is alignable relative to the chuck in the X-direction and Y-direction;
   at the side of the centering spigots a sealing member assembly including a sealing member; and
   a sealing disk removably secured between the centering disk and the main body of the workpiece pallet, said sealing disk at least radially co-extensive with said centering disk and including a portion which overhangs the centering disk radially outboard of the centering disk, said portion of the sealing disk overhanging the centering disk such that said portion sealingly comes into contact with said sealing member of the sealing member assembly when the workpiece pallet is securely clamped in place.

2. The clamping fixture as set forth in claim 1, wherein said sealing disk is arranged parallel to the centering disk and is provided in the region of the centering openings of the centering disk with depressions into which the centering spigots can extend when the workpiece pallet is clamped to the chuck.

3. The clamping fixture as set forth in claim 1, wherein disposed between said centering disk and a sealing disk is at least one spacer disk which permits an axial excursion of the centering disk in the region of the centering openings.

4. The clamping fixture as set forth in claim 3, wherein said spacer disk is provided with recesses in the region of the centering openings of the centering disk.

5. The clamping fixture as set forth in claim 1, wherein:
   as viewed cross-sectionally said workpiece pallet is configured substantially rectangular,
   the sealing member of the sealing member assembly includes a central recess shaped to correspond to the shape of the workpiece pallet, and
   the sealing disk is adapted to the shape of the recess and overhanging the latter laterally by a predetermined amount between one to five mm.

6. The clamping fixture as set forth in claim 5, wherein said sealing member of the sealing member assembly is provided with a sealing lip in the edge portion of the recess.

7. The clamping fixture as set forth in claim 1, wherein said workpiece pallet is provided with four studs which are flat-topped to form a Z-stop for the workpiece pallet on being clamped to the chuck.

8. The clamping fixture as set forth in claim 7, wherein said studs are configured to simultaneously secure the centering disk as well as the sealing disk to the main body of the workpiece pallet.

9. The clamping fixture as set forth in claim 1, wherein said sealing member assembly includes an annular mount configured to mount the sealing member for locating it on and securing it to a basic body of the chuck.

10. The clamping fixture as set forth in claim 1, wherein said sealing disk includes at least one flat side that is provided with an indentation.

11. A workpiece pallet for a clamping fixture configured as set forth in claim 1, said workpiece pallet including a main body and a centering disk secured thereto in which second centering members are defined in the form of centering openings, wherein disposed between said centering disk and said main body of the workpiece pallet is a sealing disk which overhangs the centering disk radially.

12. The workpiece pallet as set forth in claim 11, wherein between said sealing disk and the centering disk at least one spacer disk is disposed such that in the region of the centering openings the centering disk is pliantly flexible in the direction of the main body.

13. The workpiece pallet as set forth in claim 11, wherein said sealing disk is configured in one piece and is provided with depressions defined in the region of the centering openings of the centering disk.

14. The workpiece pallet as set forth in claim 11, wherein said workpiece pallet is provided with four studs which are flat-topped in forming a Z-stop, the studs configured to simultaneously secure the centering disk as well as the sealing disk to the main body of the workpiece pallet.

15. A sealing disk for a workpiece pallet configured as set forth in claim 11, said sealing disk is configured in one piece and substantially round or rectangular, that it is provided with four securing openings and that each comprises depressions defines between two juxtaposed securing openings.

16. A sealing device for a clamping fixture configured as set forth in claim 1, wherein said sealing device comprises a sealing member assembly for securing to the chuck and a sealing disk for securing to the workpiece pallet, the sealing member assembly including an annular mount and a sealing member provided with a central recess, said sealing member being locatable by means of said annular mount to the chuck and the recess being configured substantially round or square and the shape of the sealing disk corresponding to the shape of the recess and the diameter or side length of the sealing disk being at least two mm larger than the cited recess of the sealing member.

\* \* \* \* \*